(12) United States Patent  
Geitner et al.

(10) Patent No.: US 12,469,640 B2
(45) Date of Patent: Nov. 11, 2025

(54) ELECTRICAL CAPACITOR

(71) Applicant: ELECTRONICON Kondensatoren GmbH, Gera (DE)

(72) Inventors: Volker Geitner, Hundhaupten (DE); Marko Stoike, Wünschendorf/Elster (DE)

(73) Assignee: ELECTRONICON Kondensatoren GmbH, Gera (DE)

( * ) Notice: Subject to any disclaimer, the term of this patent is extended or adjusted under 35 U.S.C. 154(b) by 338 days.

(21) Appl. No.: 18/219,397

(22) Filed: Jul. 7, 2023

(65) Prior Publication Data

US 2025/0014817 A1    Jan. 9, 2025

(51) Int. Cl.
     *H01G 2/14*      (2006.01)
     *H01G 2/10*      (2006.01)
     *H01G 4/224*      (2006.01)

(52) U.S. Cl.
CPC ............... *H01G 2/14* (2013.01); *H01G 2/106* (2013.01); *H01G 4/224* (2013.01)

(58) Field of Classification Search
CPC ...... H01G 11/14; H01G 9/0003; H01G 4/224; H01G 2/106; H01G 2/14
See application file for complete search history.

(56) References Cited

U.S. PATENT DOCUMENTS

| | | | | |
|---|---|---|---|---|
| 3,377,510 A | * | 4/1968 | Rayno | H01G 2/14 361/275.1 |
| 4,757,414 A | * | 7/1988 | Barker | H01G 2/14 361/15 |

FOREIGN PATENT DOCUMENTS

| | | | | |
|---|---|---|---|---|
| DE | 2350271 A | * | 4/1975 | |
| DE | 102008062656 A1 | | 6/2010 | ............. H01G 2/10 |
| DE | 102015215729 A1 | | 2/2017 | ............. G01R 31/27 |
| DE | 102019105452 A1 | | 9/2020 | ............. G01C 3/00 |
| EP | 2194547 A1 | | 6/2010 | ............. H01G 2/14 |

* cited by examiner

*Primary Examiner* — David M Sinclair
(74) *Attorney, Agent, or Firm* — Bodner & Bodner, PLLC; Christian P. Bodner; Gerald T. Bodner

(57) ABSTRACT

The invention relates to an electrical capacitor having a capacitor can, consisting of a can envelope and a can bottom, wherein the can bottom, when an internal pressure increases above a target value, is subjected to deformation which may be detected by a sensor system. For this purpose, the sensor system gets in operative connection with a bottom external side of the can bottom. The sensor system is configured as a plate-shaped switching device in the form of hinge-like tongues formed on a substrate, wherein conductor tracks located on the substrate are separated when the tongue/s is/are deviated.

11 Claims, 2 Drawing Sheets

ELECTRICAL CAPACITOR

Figure 1:
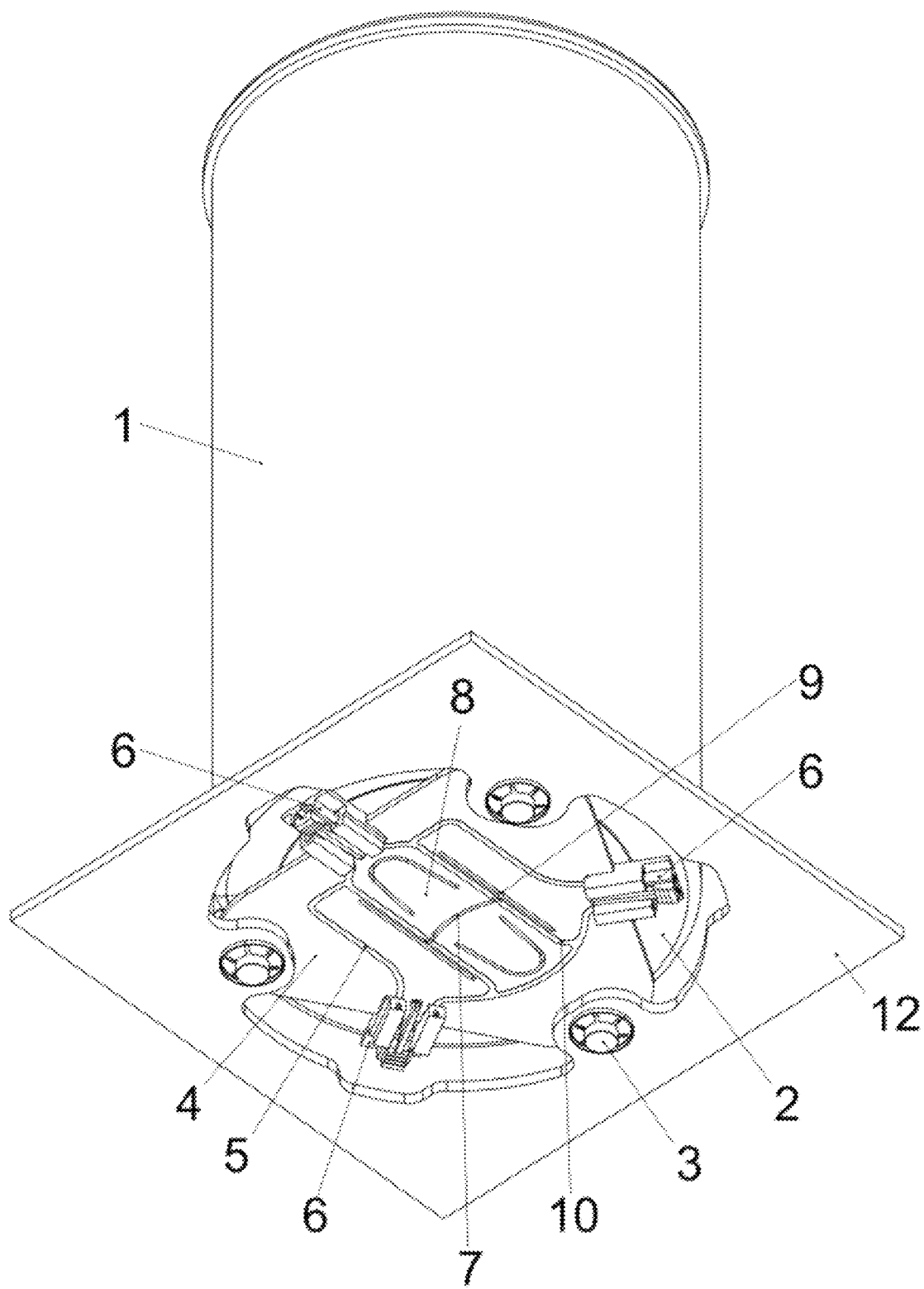

The invention relates to an electrical capacitor having a capacitor can, consisting of a can envelope and a can bottom, wherein the can bottom, when an internal pressure increases above a target value, is subjected to deformation which may be detected by a sensor system, and for this purpose, the sensor system gets in operative connection with a bottom external side of the can bottom, according to the preamble of claim 1.

From DE 271 587 A1, a capacitor protection device using electronically monitored strain gauges is already known. The strain gauges are applied onto the housings of the capacitors in order to monitor the electrical and thermal conditions of the capacitor. During the production of the capacitor, the strain gauges may be glued on, stitched, welded or affixed in a similar manner.

It is imperative in the arrangement for protecting power capacitors according to DE 245 975 A1 to create a solution enabling a protection of the capacitors by means of fiber optic cables without destroying them, with a simultaneous localization of the source of error. This occurs in that at a housing extension of a capacitor, the light from an incoming fiber optic cable is switched to a second, outgoing fiber optic cable by an appropriate optical switch, the fiber optic cable's signals are converted into electrical signals and are then linked by a downstream negator and an AND-link in such a manner that a signal disconnecting the installation is only generated when the installation works properly, but not in case of an interruption of a fiber optic cable or when the light source fails.

It is proposed in the device according to DE 10 2008 062 656 A1, which comprises a capacitor module, that a housing accommodating the capacitor cells of the capacitor is provided, wherein the housing has a capacitor chamber accommodating the capacitor cells, which is sealed in a pressure-tight manner. The internal pressure of the capacitor chamber is detected by a pressure sensor so as to determine if one of the capacitor cells had been damaged.

In case of the capacitor having the protection device according to DE 10 2015 215 729 it is proposed for detecting a state of error for the capacitor to have such a housing that the volume of the housing changes in the event of an error, wherein the change of the housing's volume is detectable by a protection device. By constructional measures, a deployable volume is integrated into the capacitor housing for this purpose. This integration is performed by shaping. It is furthermore known to utilize a pressure increase in a capacitor in order to activate overpressure tear-off safety devices in an overload event caused by a corresponding rise in pressure. When gas is formed inside the capacitor can, this leads to a movement of the connections of the capacitor so that the tear-off safety device is activated. Therewith, the capacitor is separated from its voltage source. A further energy input into the capacitor and an ascending pressure rise are avoided.

A further possibility for recognizing an emerging gas formation is to select the internal pressure of the capacitor by utilizing overpressure switches inside the capacitor. These recognize that a target internal pressure value is exceeded and provide for an error alert or a switch-off.

Overpressure switches or corresponding sensors inside the capacitor just as tear-off safety devices located within the interior result in impedance problems and manufactural efforts and thus in higher costs.

In the document DE 10 2019 105 452 A1, a further developed cylindrical capacitor can as well as an electrical capacitor having such a capacitor can are proposed, which is implemented such that overpressure within the capacitor can be detected in a particularly simple manner by an external sensor system or an external switching device, and can be used for evaluating states of errors or switching off the capacitor/s.

The structure of the capacitor can therein is designed such that even when pressure rises, the position of the capacitor wrap within the can and thus of the respective connectors, terminal parts and means like that will not change. Hereby, a defined, in particular impedance-conditioned state remains maintained. In the solution according to DE 10 2019 105 452 A1, the can bottom is subjected to deformation when the internal can pressure rises, which is recognizable by means of a sensor system disposed externally of the capacitor.

The sensor system, for example, is formed as a switch, which is in operative connection with the bottom's outside.

But the sensor system may also be an optical scanning device responding to a deformation of the can's bottom.

From the aforementioned, it is a task of the invention to propose a further developed electrical capacitor, which comprises an especially cylindrical capacitor can and is capable in case of states of error leading to a pressure increase inside the can, to ensure a safe error signalization or a switch-off of the corresponding capacitor without disadvantageous changes with respect to the internal structure or the arrangement of the capacitor wraps within the can.

The switch-off device should also be retrofittable and not necessarily be connected to the actual capacitor electricity circuit. The solution to be created should also allow capacitors to be used, in particular in power electronic applications, but also in the field of railway technology, in particular according to IEC 61071 and IEC 16881. The embodiment should furthermore satisfy the mechanical loads according to IEC standard 61373.

The solution of the task of the invention is performed by an electrical capacitor having a substantially cylindrical capacitor can, composed of a can module and a can bottom, wherein the can bottom is subjected to deformation when pressure rises above a target value, according to the feature combination of claim 1, with the subclaims representing at least advantageous further developments.

Starting from an electrical capacitor having a capacitor can according to the state of the art, which is composed of a can envelope and a can bottom, wherein the can bottom, when the internal pressure rises above a target value, is subjected to deformation, which is detectable by a sensor system, and for this purpose, the sensor system gets into operative connection with a bottom external side of the can bottom, the sensor system according to the invention is formed as a plate-shaped switching device and disposed to be spaced apart from the bottom external side and is connectable with the capacitor can.

The plate-shaped switching device is composed of an electrically insulating substrate, for example, of a typical circuit board substrate, on which several electrical conductor tracks are located which lead to electrical connection points.

These connection points may be formed as terminals, soldered connection points or means like that.

According to the invention, the substrate furthermore includes slit-shaped breakthroughs or slit-shaped recesses for forming at least one hinge-like tongue.

At least one of the conductor tracks is installed so as to extend across a predetermined breaking portion of the tongue in such a manner that when the tongue is deviated, the corresponding conductor track is separated and an electricity circuit formed while utilizing the connection points is interrupted.

Thus, the bottom external side deforming with internal pressure or a protrusion located there gets into mechanical contact with the hinge-like tongues of the substrate. Hereby, the tongue is deviated from its two-dimensional original position. The deviation destroys the corresponding conductor track/s and leads to the mentioned separation of a corresponding electricity circuit, whereby a state of error of the corresponding capacitor can be signalized.

The corresponding conductor tracks can be formed of a copper-clad material of a circuit board.

For producing the operative connection of the bottom external side of the can bottom and the at least one hinge-like tongue, a pin-like or bolt-like protrusion extends from the bottom external side of the can bottom towards the tongue of the plate-shaped substrate, which protrusion exerts an actuating force upon the tongue when the internal pressure rises.

This pin-like or bolt-like protrusion may be configured to be formed onto the can bottom or connected to the can bottom, for example, as a rivet.

In a configuration of the invention, protrusions formed as local elevations, extend furthermore from the can envelope towards the can bottom.

These protrusions serve the purpose of fastening the plate-shaped switching device, on the one hand.

On the other hand, these protrusions may have bolt-like fastening means.

These then allow both the plate-shaped switching device to be held and the capacitor to be fixed, for example, on a carrier or a housing portion of a corresponding electrotechnical component.

The bolt-like fastening means build a triangle by way of example. The substrate of the plate-shaped switching device will then have a triangular shape, wherein the fastening of the triangular switching device or of a substrate formed in such a manner is possible at the corner points of the triangle while using the bolt-like fastening means.

In the center of the substrate, the slit-shaped breakthroughs or recesses have, for example, the shape of an H for forming two hinge-like tongues.

In this embodiment, the conductor tracks are installed so as to extend over the interconnecting section of the legs of the H.

The conductor tracks may form a geometric constriction in the area of this interconnecting section, i.e., have reduced dimensions with respect to the conductor track width or conductor track thickness.

The previously mentioned connecting leg of the H is not formed completely as a breakthrough.

The substrate below the conductor tracks within the interconnecting section remains maintained in a preferred embodiment.

Hereby, it is prevented that upon mechanical loads, in particular vibrations when the capacitors are used in a respective critical environment, an undesired deviation of the tongues occurs including a possibly not desired destruction or separation of the conductor tracks.

On the other hand, the stability of the substrate material remained maintained below the conductor tracks is so small that the force component generated upon the capacitor can bottom bulging is sufficient to move the corresponding tongues in the desired manner and to ensure that the conductor tracks are surely separated.

In a region located on both sides of the connecting section of the H on the substrate and mostly within the substrate surface comprised by the H, further breakthroughs are present so as to form a defined hinge axis of the respective hinge-like tongue.

According to an embodiment of the invention, these further breakthroughs are formed so as to have a substantially but not compulsory U shape or V shape, wherein the opening of the U shape or V shape is oriented towards the connecting section. As far as the shape and configuration of the breakthroughs is concerned, for example, even as a linear slit, the formation of a defined hinge for deliberately moving the concerned tongue is decisive.

The invention will be explained below in more detail on the basis of an exemplary embodiment as well as of Figures.

Figure 2:
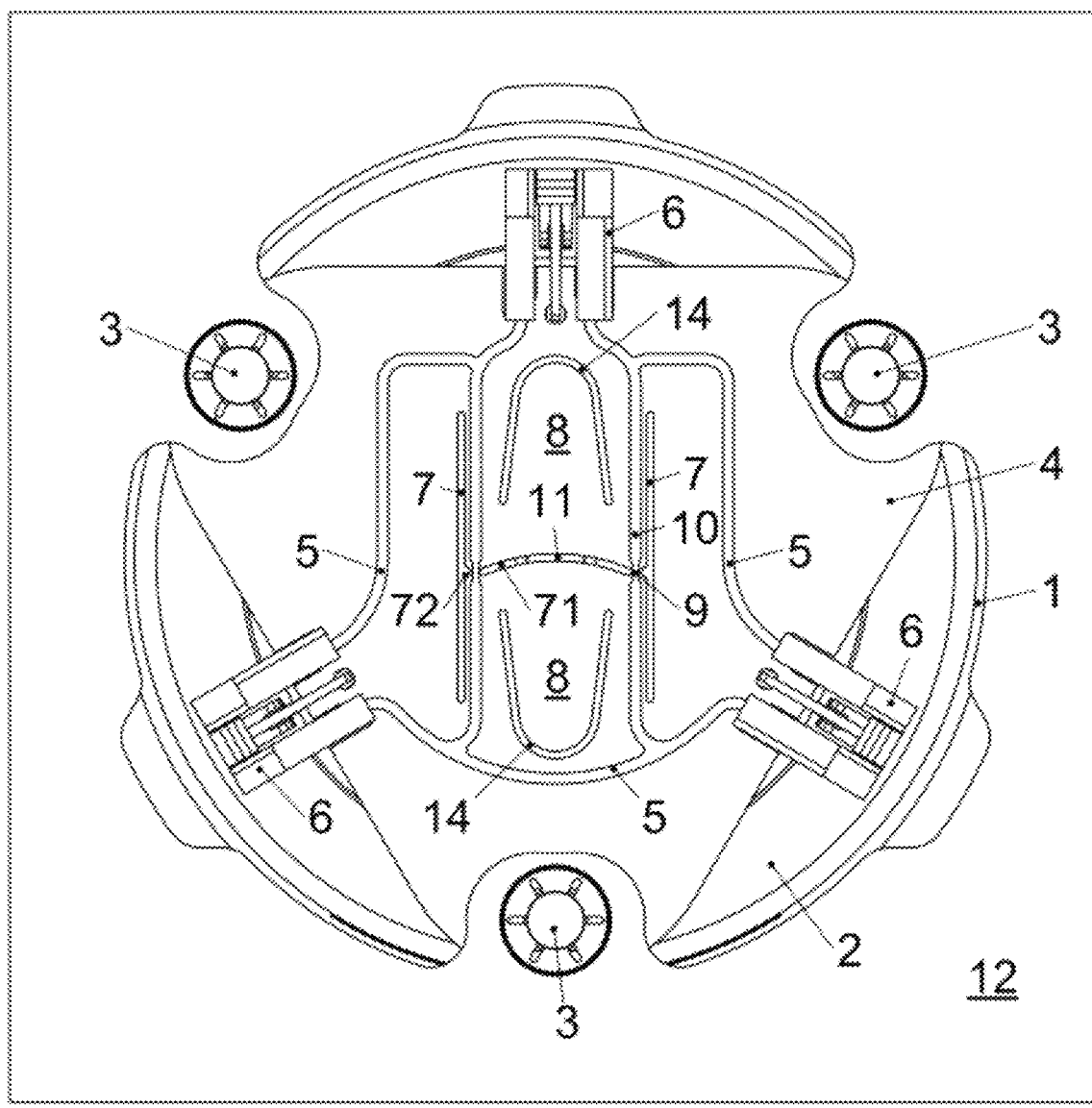

Shown are in:

FIG. 1 a perspective representation of the bottom side of an electrical cylindrical capacitor attached to a carrier with a view to the bottom side of the plate-shaped switching device together with connection points; and FIG. 2 a detailed representation of a bottom side view of the plate-shaped switching device with recognizable details of the slit-shaped breakthroughs or recesses formed within the substrate together with the exemplary guidance of the electrical conductor tracks, which are separable by hinge-like tongues when the internal pressure within the capacitor rises.

The electrical capacitor shown in part in FIG. 1 is composed of a can envelope 1 and a can bottom 2.

Within the can envelope, i.e., within the capacitor can, an arrangement of one or more capacitor wraps is located, which are electrically interconnected, and are in connection with a connection fitting (not shown) located on the top side of the capacitor can.

The capacitor's can bottom 2 is subjected to deformation when the internal pressure rises above a target value. This deformation is detectable by a sensor system.

For this purpose, the sensor system gets into operative connection with a bottom external side of the can bottom 2.

The sensor system is formed as a plate-shaped switching device and spaced from the bottom external side and the bottom can 2, respectively, and is connectable to the capacitor can via bolt-like attachment means 3.

The plate-shaped switching device is composed of an electrically insulating substrate 4, on which several electrical conductor tracks 5 leading to electrical connection points 6 are located.

The substrate 4 has slit-shaped breakthroughs or recesses 7 for forming at least one hinge-like tongue 8.

At least one of the conductor tracks 5 is installed so as to extend across a predetermined breaking portion 9 of the tongue 8. And this in such a manner that, when the tongue 8 is deviated, the corresponding conductor track 10 is separated and an electricity circuit formed while using the connection points 6 is interrupted.

A pin-like or bolt-like protrusion 11 extends from the bottom external side of the can bottom 2 towards the tongues 8 of the plate-shaped substrate 4 and exerts an actuating force onto the two tongues 8 shown in FIG. 2 when the internal pressure rises.

By means of the already mentioned bolt-like fastening means 3, the entire arrangement can be fixed on a carrier 12.

The bolt-like fastening means 3, for example, build a triangle. According to the embodiment shown, the plate-shaped switching device and the substrate 4, respectively, have a triangular shape.

The already mentioned slit-shaped breakthroughs or recesses 7 are present in the center of the substrate 4.

These build for example the shape of an H so that two of the mentioned hinge-like tongues 8 are generated.

The conductor tracks 10 are installed so as to extend over the interconnecting section 71 of the legs of the H. As it is obvious from FIG. 2, the interconnecting section 71 is not completely formed as a breakthrough, rather a part of the substrate 4 remains maintained below the conductor tracks within the interconnecting section 71.

But on the other hand, the substrate 4 has a weakening area 72 below the conductor tracks 7 in the interconnecting section 71 and/or in its immediate proximity. This may be realized, for example, in the form of a notch.

In an area which is located on both sides of the interconnecting section 71 on the substrate 4 and mostly within the substrate surface comprised by the H, further breakthroughs or recesses 14 are present so as to build a defined hinge axis for the respective hinge-like tongue 8.

These further breakthroughs 14 have a linear or substantially U-shape or V-shape, wherein the opening of the U-shape or V-shape is oriented towards the interconnecting section 71.

The conductor tracks 5 or 10 are formed between the connection points 6 on the substrate 4 such that a totally different interconnection in series or in parallel of various sensor systems may be performed so as to recognize states of error. This enables a universal use of the sensor system formed as a switching device.

For the substrate, a commercially available circuit board material can be used. The breakthroughs or recesses 7 may be realized by milling or punching out. The conductor tracks are structured and formed in known etching technology.

The underside of the pin-like or bolt-like protrusion 11 extending from the bottom external side of the can bottom 3 towards the tongue 8 of the plate-shaped substrate 4 encounters virtually centrically the interconnecting section 71 in the shown example according to FIGS. 1 and 2 in order to deviate both of the tongues 3 correspondingly, so that a safe switch-off is possible or a signalizing signal can be provided.

The invention claimed is:

1. An electrical capacitor having a capacitor can, consisting of a can envelope (1) and a can bottom (2), wherein the can bottom (2), when an internal pressure increases above a target value, is subjected to deformation which may be detected by a sensor system, and for this purpose, the sensor system gets in operative connection with a bottom external side of the can bottom (2),
characterized in that
the sensor system is formed as a plate-shaped switching device and disposed to be spaced apart from the bottom external side and is connectable with the capacitor can,
the plate-shaped switching device is composed of an electrically insulating substrate (4), on which several electrical conductor tracks (5; 10) are located which lead to electrical connection points (6), the substrate (4) furthermore includes slit-shaped breakthroughs or slit-shaped recesses (7; 71) for forming at least one hinge-like tongue (8), wherein at least one of the conductor tracks (5; 10) is installed so as to extend across a predetermined breaking portion (9) of the tongue (8) in such a manner that when the tongue (8) is deviated, the corresponding conductor track (10) is separated and an electricity circuit formed while utilizing the connection points (6) is interrupted.

2. The electrical capacitor according to claim 1, characterized in that
a pin-like or bolt-like protrusion (11) extends from the bottom external side of the can bottom (3) towards the tongue (8) of the plate-shaped substrate (4), which protrusion exerts an actuating force upon the tongue when the internal pressure rises.

3. The electrical capacitor according to claim 1, characterized in that
protrusions extend furthermore from the can envelope (1) towards the can bottom (2) for fastening the plate-shaped switching device.

4. The electrical capacitor according to claim 3, characterized in that
the protrusions have bolt-like fastening means (3), which serve the purpose of holding the plate-shaped switching device and/or fixing the capacitor on a carrier (12).

5. The electrical capacitor according to claim 4, characterized in that
the bolt-like fastening means (3) build a surface, and the substrate (4) of the plate-shaped switching device is adapted to this surface.

6. The electrical capacitor according to claim 1, characterized in that
in the center of the substrate (4), the slit-shaped breakthroughs or recesses (7; 71) have the shape of an H for forming two hinge-like tongues (8), wherein the conductor tracks (10) are installed so as to extend over the interconnecting section (71) of the legs of the H.

7. The electrical capacitor according to claim 6, characterized in that
the interconnecting section (71) is not completely formed as a breakthrough, rather the substrate remains maintained below the conductor tracks (10) within the interconnecting section.

8. The electrical capacitor according to claim 7, characterized in that
the substrate (4) has a weakening area (72) below the conductor tracks (10) in the interconnecting section (71) and/or in its immediate proximity.

9. The electrical capacitor according to claim 6, characterized in that
in an area which is located on both sides of the interconnecting section (71) on the substrate (4) and mostly within the substrate surface comprised by the H, further breakthroughs (14) are present so as to build a defined hinge axis for the respective hinge-like tongue (8).

10. The electrical capacitor according to claim 9, characterized in that
the further breakthroughs (14) substantially have a U-shape or V-shape, wherein the opening of the U-shape or V-shape is oriented towards the interconnecting section (71).

11. The electrical capacitor according to claim 1, characterized in that
in the center of the substrate (4), the slit-shaped breakthroughs or recesses have a cross-shape or triangular shape for forming at least one hinge-like tongue (8).

* * * * *